US009489668B2

(12) United States Patent
Jimenez Alamo

(10) Patent No.: US 9,489,668 B2
(45) Date of Patent: Nov. 8, 2016

(54) ELECTRONIC PAYMENT DEVICE

(71) Applicants: Intelligent Data S.L., Madrid (ES); Flypos, S.L., Madrid (ES)

(72) Inventor: Antonio Jimenez Alamo, Madrid (ES)

(73) Assignee: Flypos, S.L., Madrid (ES)

( * ) Notice: Subject to any disclaimer, the term of this patent is extended or adjusted under 35 U.S.C. 154(b) by 92 days.

(21) Appl. No.: 14/304,832

(22) Filed: Jun. 13, 2014

(65) Prior Publication Data

US 2015/0095223 A1    Apr. 2, 2015

(30) Foreign Application Priority Data

Sep. 30, 2013   (ES) .................................. 201331418

(51) Int. Cl.
*G06Q 40/00*   (2012.01)
*G06Q 20/32*   (2012.01)
*G06Q 20/38*   (2012.01)

(52) U.S. Cl.
CPC .......... *G06Q 20/3227* (2013.01); *G06Q 20/32* (2013.01); *G06Q 20/325* (2013.01); *G06Q 20/382* (2013.01); *G06Q 2220/00* (2013.01)

(58) Field of Classification Search
CPC .. G06Q 20/32; G06Q 20/20; G06Q 20/3278; G06Q 20/3226; G06K 7/10415; G06K 7/082
USPC ......................................................... 705/44
See application file for complete search history.

(56) References Cited

U.S. PATENT DOCUMENTS 3,957,173 A * 5/1976 Roudebush ........... G07F 19/202
                                                    109/19
5,796,335 A * 8/1998 Droege ................ G08B 13/128
                                                    109/78
6,305,602 B1 * 10/2001 Grabowski .......... H03K 17/945
                                                    235/379
7,640,658 B1 * 1/2010 Pham ................... H05K 1/0275
                                                    257/679

(Continued)

FOREIGN PATENT DOCUMENTS

ES      EP 2584513 A2 *   4/2013   .......... G09B 21/006
ES      2 423 234 A2      9/2013

(Continued)

OTHER PUBLICATIONS

3PEA international, inc. announces PayPad(R) V3 PC-POS payment terminal. (Jan. 31, 2007). PR Newswire Retrieved from http://dialog.proquest.com/professional/docview/671988399?accountid=142257 on Jul. 5, 2016.*

(Continued)

*Primary Examiner* — Kito R Robinson
(74) *Attorney, Agent, or Firm* — Blakely, Sokoloff, Taylor & Zafman LLP

(57) ABSTRACT

An electronic payment device is disclosed which is portable and makes use of existing wireless connections for data transfer. The device described herein makes it possible to obtain information from different data sources such as credit cards with magnetic stripe. The device incorporates anti-manipulation means which detect any improper or unauthorized access to the device, so that a circuit which is connected to the central unit and powered by the system supply device or an auxiliary system is monitored to determine that the circuit is closed and not altered in any way, which would occur on attempting to access the device as the fine thread mesh comprising the flexible circuit would be affected by an unauthorized or forced access.

9 Claims, 1 Drawing Sheet

(56) References Cited

U.S. PATENT DOCUMENTS

| | | | | |
|---|---|---|---|---|
| 7,922,080 | B1* | 4/2011 | Doland | G07F 19/206 |
| | | | | 235/379 |
| 8,336,771 | B2 | 12/2012 | Tsai et al. | |
| 8,403,219 | B2 | 3/2013 | Narendra et al. | |
| 8,438,066 | B1 | 5/2013 | Yuen et al. | |
| 2003/0011466 | A1* | 1/2003 | Samuel | A45C 13/24 |
| | | | | 340/5.73 |
| 2003/0046231 | A1* | 3/2003 | Wu | G06Q 20/04 |
| | | | | 705/43 |
| 2006/0049255 | A1* | 3/2006 | von Mueller | G06F 21/72 |
| | | | | 235/449 |
| 2006/0213973 | A1* | 9/2006 | Chan | G06K 7/084 |
| | | | | 235/380 |
| 2007/0265949 | A1* | 11/2007 | Elder | G06Q 40/00 |
| | | | | 705/35 |
| 2009/0060194 | A1* | 3/2009 | Mackey | G06F 21/554 |
| | | | | 380/277 |
| 2010/0024046 | A1* | 1/2010 | Johnson, Jr. | G06F 21/86 |
| | | | | 726/34 |
| 2010/0053919 | A1* | 3/2010 | Bonnet | G06F 21/86 |
| | | | | 361/760 |
| 2010/0265681 | A1* | 10/2010 | Lambert | G06K 7/0021 |
| | | | | 361/760 |
| 2012/0126004 | A1* | 5/2012 | Chen | G06K 7/006 |
| | | | | 235/435 |
| 2013/0103190 | A1* | 4/2013 | Carapelli | G06F 21/82 |
| | | | | 700/237 |
| 2013/0140364 | A1* | 6/2013 | McJones | G06K 7/082 |
| | | | | 235/449 |
| 2013/0161086 | A1* | 6/2013 | Mayer | H05K 5/0217 |
| | | | | 174/535 |
| 2014/0061222 | A1* | 3/2014 | Allan | G07F 19/2055 |
| | | | | 221/219 |
| 2014/0144976 | A1* | 5/2014 | Angus | G07D 7/12 |
| | | | | 235/375 |
| 2014/0150056 | A1* | 5/2014 | Williams | G06F 21/36 |
| | | | | 726/2 |

FOREIGN PATENT DOCUMENTS

| | | |
|---|---|---|
| WO | WO 2007/018761 A2 | 2/2007 |
| WO | WO 2010/076597 A1 | 7/2010 |
| WO | WO 2012/154915 A1 | 11/2012 |
| WO | WO 2013/013168 A2 | 1/2013 |
| WO | WO 2013/051029 A1 | 4/2013 |

OTHER PUBLICATIONS

Florida restaurant completes test of hypercom "Pay at the table" card payment terminal. (Jun. 27, 2001). Business Wire Retrieved from http://dialog.proquest.com/professional/docview/675684904?accountid=142257 on Jul. 5, 2016.*

E-smart(R) technologies, inc., announces next generation superthin polyimide flexible circuit biometric super smart card(TM) card, the 'i am'(TM) card. (Jan. 8, 2008). PR Newswire Retrieved from http://dialog.proquest.com/professional/docview/675266593?accountid=142257 on Jul. 5, 2016.*

Carapelli, G., & Robertson, P. A. (1401). Fuel dispenser input device tamper detection arrangement Retrieved from http://dialog.proquest.com/professional/docview/1551095777?accountid=142257 on Jul. 5, 2016.*

European Patent Office Communication enclosing Extended European Search Report for corresponding European Patent Application No. 14169611.2, 8 pp., (Feb. 25, 2015).

* cited by examiner

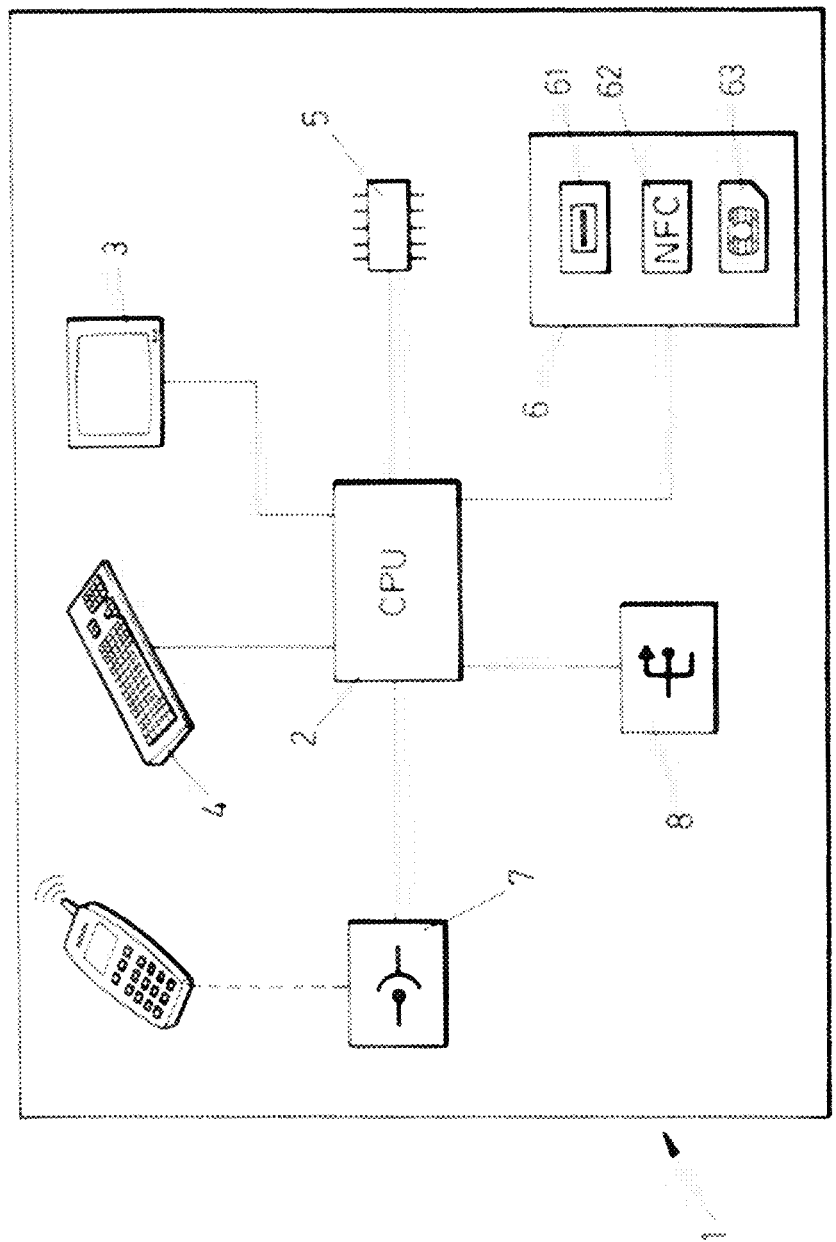

ELECTRONIC PAYMENT DEVICE

FIELD

The present invention lies within the field of electronic payment means.

The object of the invention consists of a portable electronic device which enables managing means of payment such as data-carrying credit cards which makes it possible to make the payments of the products or services payable.

BACKGROUND OF THE INVENTION

Electronic payment means have become a commonly used alternative in the payment of products and services which are performed daily.

In this regard, documents are known such as:

U.S. Pat. No. 8,336,771 "PAYMENT CARD TERMINAL DONGLE FOR COMMUNICATIONS DEVICES" of BBPOS Limited, Hong Kong (HK), where it details a device which connects to the audio/earpiece jack of host devices, allows them to accept payment cards as a point of sale (POS) terminal. It contains a magnetic stripe card reader, a smart card reader, and/or a proximity card reader; a microprocessor or microcontroller (CPU); and a circuit for drawing power from a digital audio signal (power circuit). Payment card data is collected by the reader(s), passed to the CPU where it is encrypted, encoded, and modulated, sent to the host device, through the Microphone input contact of the audio/earpiece jack, then transmitted via, one the host device's networks to a merchant account provider for processing. The digital audio signal, constantly generated by the host device, provides power to the device via the power circuit; this solution requires wired connection suing a jack-type connector both for information exchange and to power the card reader device.

U.S. Pat. No. 8,403,219 "APPARATUS WITH SMART-CARD CIRCUITRY POWERED BY A MOBILE DEVICE" of Tyfone, Inc., Portland, Oreg. (US): In this document an electronic transaction card communicates with an add-on slot of an intelligent electronic device. The add-on slot may be a memory card slot. The intelligent electronic device may be a mobile phone or other device with or without network connectivity. The electronic transaction card may be compatible with magnetic card readers, smartcard, other point-of-sale interfaces, or any combination thereof. This solution requires an adapted card to insert in our mobile device.

U.S. Pat. No. 8,438,066 "SECURE GEO-FENCING WITH MULTI-FORM AUTHENTICATION" of Intuit Inc., Mountain View, Calif. (US) details a method for authenticating a geo-fencing payment, including receiving based on a wireless protocol of the geo-fencing payment, a payment account number associated with a mobile device of a consumer, wherein the payment account number is sent automatically to a POS device without user intervention when the mobile device is within a pre-determined range of the POS device, receiving a security code and an identifier of a merchandise that are inputted into the POS device by the consumer, determining that the mobile device is within the pre-determined range when the security code and the identifier are received, submitting, to a computer server, a merchandise order comprising a payment amount, the payment account number, and the security code, and receiving an authorization from the computer server to release the merchandise, the computer server compares it with an existing profile. However, in this solution, the mobile must be associated in turn to a profile in the computer server.

SUMMARY

The object of the invention is an electronic data reader device which makes it possible to make payments securely using, for data management, the connection of our own mobile phone to a data network such as Internet. The device described herein has a size and dimensions which make it portable and easy-to-use for the user.

This device has: a central processing unit (CPU), formed by a microprocessor, a security processing unit and a security opening device (to guarantee security of the data and codes used in the methods of payment). It also has a NVM memory and a RAM (configurable in different capacities).

As interaction peripherals between the devices and the user: we have a LCD screen; a keyboard to enter security codes; and a buzzer (sound device, which indicates both keystrokes, and terminal status). To make payments, it contemplates the possibility of equipping the device described herein with one or several types of readers such as magnetic stripe reader (which is read by a supplementary accessory); ContactLess card reader (NFC (Near field communication) and EMV contactless technology), the use of which is growing exponentially; and a memory card or smart card reader such as the chip cards known as SmartCards.

It has various wireless communication means between the device and the Smartphone: by Bluetooth or WIFI connection.

The device object of the invention has several connectors, preferably two connectors: a μUSB connector, which can be used for charging the battery, and loading possible software updates; and a μHDMI connector, peripherals expansion.

As supply means, an embodiment is complemented where the device is equipped with two batteries, one of them auxiliary.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

FIG. 1.—Shows a block diagram of the device object of the invention.

DETAILED DESCRIPTION

In light of FIG. 1, showing the device and its components, a preferred embodiment of the device (1) object of the invention is described below, which is found inside a light casing to maintain the reduced dimensions of the device (1) described here.

For its use, the device (1) is governed by a central processing unit (2) whereto are associated:

At least one data display means (3), such as a LED or LCD type screen which allows the user to obtain information on different data related to the device (1) such as messages, icons or other information of interest.

data input means (4), such as at least one magnetic stripe reader (61) to be able to take data comprised in magnetic stripes of magnetic cards such as credit cards, at least one contactless card reader (62) which makes it possible to obtain data comprised in contactless NFC or EMV type cards, and at least one memory card reader (63).

data storage means (5).

communication means (7) comprising at least one wireless communications module.

At least one data input port (8), such as a USB port or any similar serial communications port.

To make a payment the device (1) connects to a mobile phone terminal by the wireless communications module establishing a data connection making use of either Bluetooth or WiFi between the terminal and the device (1), this latter allowing access to data networks.

The device (1) is powered by at least one battery that can be charged by charging means which can be defined by a USB-type port or similar, which in a preferred embodiment is the data input port (8). Likewise, a possible alternative embodiment is considered wherein auxiliary supply means, such as an auxiliary battery, are included.

Since it is a device (1) for electronic payment, its security cannot be compromised, for this reason it has:

manipulation detection means of the device (1) to detect any intrusion, said manipulation detection means to detect intrusions or manipulations of the device. Therefore, the device (1) comprises, internal to its casing and surrounding all the electronic elements, at least one flexible circuit connected to the central processing unit (2); a circuit which has a mesh with fine-structure width connected to the interior of the electronics and it verifies 24h that there is no short-circuit or open circuit in the circuit. Therefore, the processing unit (2) is adapted to monitor the flexible circuit to verify that there is no short-circuit or open circuit in said flexible circuit.

An encryption system associated to the processing unit (2) responsible for encrypting all the data both of the data sent or received and that stored.

In a possible alternative embodiment, acoustic signal generation means are installed in the device (1) designed to produce at least one sound in response to a command generated by the processor (2) such as device (1) status signals such as low battery status or start or end of an operating mode.

In an even more alternative possible embodiment, expansion means are disposed in the device associated to the processing unit (2) and which may be defined by interfaces such as multimedia interfaces, HDMI or micro-HDMI type, making it possible to connect the device (1) to another electronic device such as screens, projector or other systems.

What is claimed is:

1. A portable electronic payment device, the portable electronic payment device comprising:
    a central processing unit;
    a data display;
    a data input device
    a data storage system;
    a communication system comprising a wireless communications module;
    a data input port;
    a data reading system comprising a magnetic stripe reader, a contactless card reader, and a memory card reader; and
    a flexible circuit connected to the central processing unit, internal to a casing of the portable electronic payment device and surrounding all components of the payment device for detecting intrusions or manipulations with respect to the payment device, the flexible circuit comprising a mesh with fine-structure width connected to an interior of electronics of the payment device.

2. The device of claim 1, further comprising an acoustic signal generation device designed to produce at least one sound in response to a command generated by the central processing unit.

3. The device of claim 1, further comprising an auxiliary supply system.

4. The device of claim 1, further comprising a charging port.

5. The device of claim 1, wherein the communication system is operative to perform a data connection with at least one mobile telephone terminal to establish a data network connection.

6. The device of claim 1, wherein the data are encrypted by a data encrypting system associated with the central processing unit.

7. The device of claim 1, wherein the flexible circuit a mesh with a fine structure width.

8. The device of claim 1, wherein the central processing unit is adapted to monitor the flexible circuit to verify that there is no short-circuit or open circuit in the flexible circuit.

9. The device of claim 1, further comprising an expansion system associated with the central processing unit, the expansion system comprising a multimedia interface.

* * * * *